US011625558B2

(12) United States Patent
Alperovich et al.

(10) Patent No.: US 11,625,558 B2
(45) Date of Patent: Apr. 11, 2023

(54) PUNCTUATION CONTROLLED MACHINE LEARNING MODEL TEMPORAL VALIDITY

(71) Applicant: Microsoft Technology Licensing, LLC, Redmond, WA (US)

(72) Inventors: Alexander Alperovich, Redmond, WA (US); Kanstantsyn Zoryn, Redmond, WA (US); Krishna G. Mamidipaka, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 633 days.

(21) Appl. No.: 16/713,761

(22) Filed: Dec. 13, 2019

(65) Prior Publication Data

US 2021/0182619 A1    Jun. 17, 2021

(51) Int. Cl.
*G06F 16/907* (2019.01)
*G06K 9/62* (2022.01)
*G06N 20/00* (2019.01)

(52) U.S. Cl.
CPC ......... *G06K 9/6262* (2013.01); *G06F 16/907* (2019.01); *G06K 9/6221* (2013.01); *G06N 20/00* (2019.01)

(58) Field of Classification Search
CPC ............... G06K 9/6262; G06K 9/6221; G06F 16/907; G06N 20/00
USPC ........................................................ 706/12
See application file for complete search history.

(56) References Cited

U.S. PATENT DOCUMENTS

| 10,216,558 | B1* | 2/2019 | Gaber ................. G06F 11/0727 |
| 2011/0093491 | A1* | 4/2011 | Zabback ........... G06F 16/24535 |
| | | | 707/769 |
| 2011/0093866 | A1 | 4/2011 | Grabs et al. |
| 2017/0228305 | A1* | 8/2017 | Krishnan .............. G06T 11/206 |
| 2017/0359398 | A1* | 12/2017 | Li ......................... H04L 65/762 |
| 2018/0293501 | A1* | 10/2018 | Ambati .................... G06N 5/02 |
| 2019/0129992 | A1* | 5/2019 | Ewen .................. G06F 16/2365 |

(Continued)

OTHER PUBLICATIONS

Akidau, et al., "The Dataflow Model: A Practical Approach to Balancing Correctness, Latency, and Cost in Massive-Scale, Unbounded, Out-of-Order Data Processing", In Proceedings of the VLDB Endowment, vol. 8, No. 12, Aug. 31, 20215, pp. 1792-1803.

(Continued)

*Primary Examiner* — Jin Ge
(74) *Attorney, Agent, or Firm* — Weaver IP L.L.C.

(57) ABSTRACT

Data events of an event stream are processed in accordance with temporally valid machine learning models. A streaming node may receive data events via an event stream. Each data event may be associated with a timestamp. The streaming node may also utilize punctuation events that specify the temporal validity of available machine learning models. The streaming node performs a temporal join operation for each data event based on its timestamp and the temporal validity. If the data event's timestamp is less than or equal to the punctuation event's timestamp, the data event is provided to the temporally valid machine learning model for processing thereby. If the data event's timestamp is greater than the punctuation event's timestamp, the data event is held until a subsequent punctuation event specifying a later timestamp is received.

20 Claims, 8 Drawing Sheets

(56) References Cited

U.S. PATENT DOCUMENTS

2020/0034665 A1* 1/2020 Ghanta .................. G06N 5/04

OTHER PUBLICATIONS

Arasu, et al., "The CQL continuous query language: semantic foundations and query execution", The VLDB Journal, vol. 15, Issue 2, Jun. 1, 2006, pp. 121-142.

Park, et al., "StreamBox-TZ: Secure Stream Analytics at the Edge with TrustZone", In Proceedings of the USENIX Annual Technical Conference, Jul. 10, 2019, pp. 537-554.

"International Search Report and Written Opinion Issued in PCT Application No. PCT/US20/059771", dated Mar. 1, 2021, 13 Pages.

* cited by examiner

PUNCTUATION CONTROLLED MACHINE LEARNING MODEL TEMPORAL VALIDITY

BACKGROUND

Event stream processing refers to the process of quickly analyzing time-based data, such as time series data. In the context of event stream processing, the term "event" refers to any occurrence that happens at a defined time and can be recorded using one or more data fields. An "event stream" is a sequence of multiple data events, which may be ordered by time. Some examples of different types of event streams include Internet of Things (IoT) data (e.g., sensor data, signals from control systems, location information), business transactions (e.g., customer orders, bank deposits, invoices), and information reports (e.g., social media updates, market data, weather reports). There are a wide variety of industries that can benefit from event stream processing, including network monitoring, cybersecurity, retail optimization, surveillance, fraud detection, financial trading, and e-commerce.

With traditional approaches, data is typically processed after it has been stored. Advantageously, event stream processing allows data to be analyzed as it is being created and before it is persistently stored. For example, data may be analyzed when it is streaming from one device to another. This allows for faster reaction time and may even provide an opportunity for proactive measures to be taken.

Event stream processing may be utilized to identify meaningful patterns or relationships within event streams in order to detect and/or predict relationships like event correlation, causality, or timing. Such identification may be performed using machine learning models that perform a predictive analysis to generate a prediction and/or classification (hereinafter referred to as a "score") with respect to the data events. Over time, the machine learning model may be modified, refined, and/or improved based on updated training data (e.g., additional data events). Thus, the version of the machine learning model that is used to score data events received at one particular point in time may differ than the version used at another particular point in time. This becomes problematic when trying to reproduce the exact same results of the predictive analysis if the right version of the machine learning model is not used at the proper time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described herein directed to processing data in accordance with temporally valid machine learning models.

In an implementation, data events of an event stream are processed in accordance with temporally valid machine learning models. For example, a streaming node may receive data events via an event stream. Each data event may be associated with a timestamp. The streaming node may also utilize punctuation events that specify the temporal validity of available machine learning models. For instance, the punctuation event may comprise a timestamp that indicates a latest time period for which there is a temporally valid machine learning model. The streaming node performs a temporal join operation for each data event based on its timestamp and the punctuation event's timestamp. If the data event's timestamp is less than or equal to the punctuation event's timestamp, this means that a temporally valid machine learning model is available, and the data event is provided to the temporally valid machine learning model for processing thereby. If the data event's timestamp is greater than the punctuation event's timestamp, this means that a temporally valid machine learning model is not yet available, and the data event is held until a subsequent punctuation event specifying a later timestamp is received. Accordingly, the techniques described herein ensure that data events are passed to a machine learning model only when they are temporally valid.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
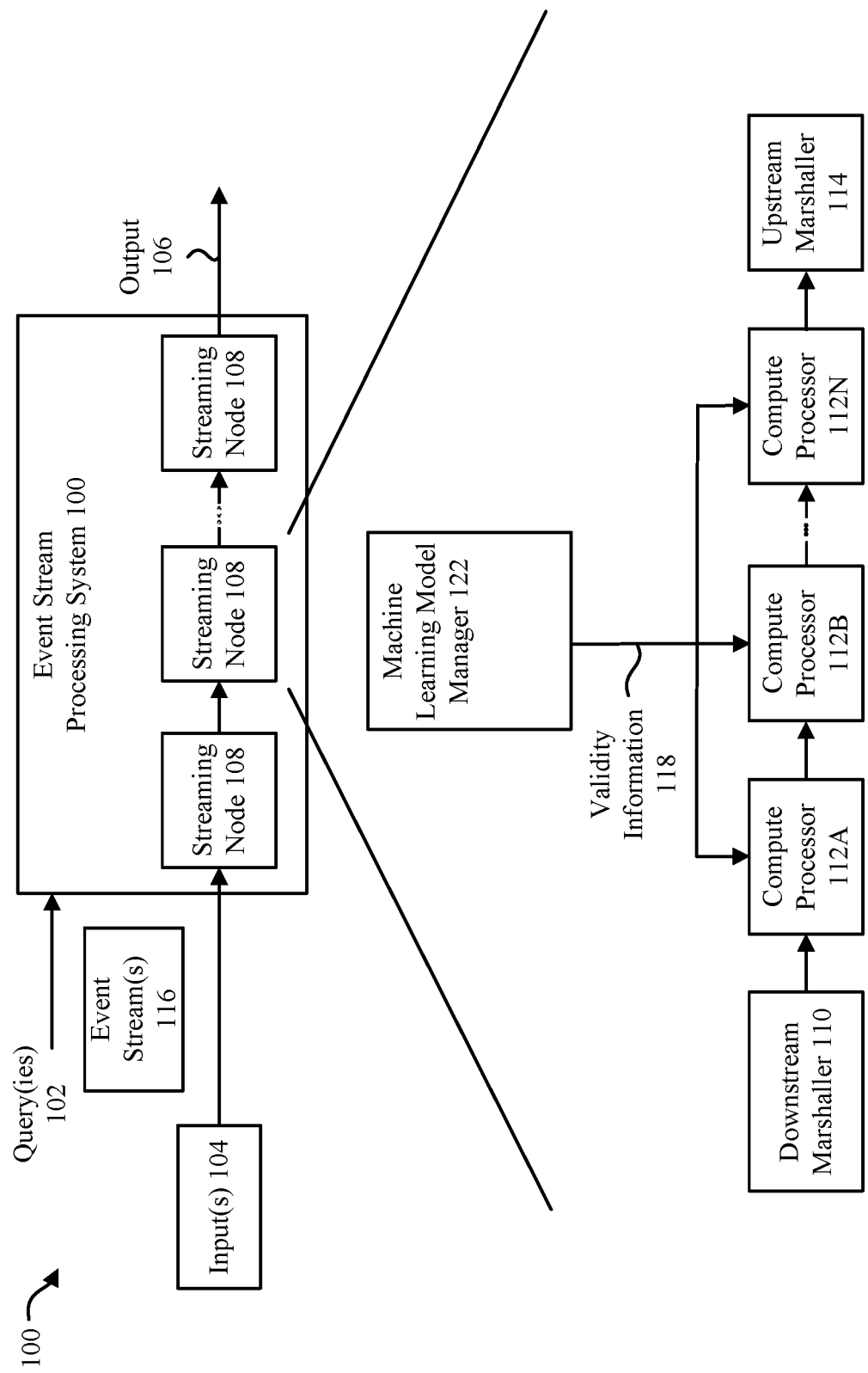
FIG. 1 shows a block diagram of an event stream processing system in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are configured to process data events in accordance with temporally valid machine learning models. For example, a streaming node may receive data events via an event stream. Each data event may be associated with a timestamp. The streaming node may also utilize punctuation events that specify the temporal validity of available machine learning models. For instance, the punctuation event may comprise a timestamp that indicates a latest time period for which there is a temporally valid machine learning model. The streaming node performs a temporal join operation for each data event based on its timestamp and the punctuation event's timestamp. If the data event's timestamp is less than or equal to the punctuation event's timestamp, this means that a temporally valid machine learning model is available, and the data event is provided to the temporally valid machine learning model for processing thereby. If the data event's timestamp is greater than the punctuation event's timestamp, this means that a temporally valid machine learning model is not yet available, and the data event is held until a subsequent punctuation event specifying a later timestamp is received. Accordingly, the techniques described herein ensure that data events are passed to a machine learning model only when they are temporally valid.

The embodiments described herein may provide several computing efficiencies. For instance, as will be described herein, machine learning models may be preloaded into memory responsive to discovering new machine learning models, rather than waiting for explicit requests to utilize such machine learning models. In particular, it may be anticipated that a newly-added machine learning model is to be utilized to process a data event in the near future. In response to discovering a new machine learning model version, the machine learning model is preloaded in memory. Such a technique advantageously reduces the latency to process data events. In particular, the machine learning model will already be loaded in memory by the time (or near the time) the relevant data event(s) are provided thereto, thereby enabling the data event(s) to be processed immediately (rather than having to wait for the machine learning model to be loaded responsive to an explicit request).

In another example, a single copy of a machine learning model may be utilized to analyze data events from a plurality of different event streams. Given that machine learning models may be very large in size (e.g., 100s of MB), using a single copy of a machine learning model to process a plurality of event streams may advantageously save a large amount of memory.

In yet another example, the machine learning model may be centralized so that a plurality of different streaming nodes may utilize the same copy of a machine learning model. This advantageously reduces the processing and power requirements for a streaming node.

FIG. 1 shows a block diagram of an event stream processing system 100 in accordance with an embodiment. Event stream processing system 100 may be configured to receive and respond to one or more queries 102, which may be provided as input from a user. Query(ies) 102 may be configured to specify a particular operation to be performed by event stream processing system 100. In response to query(ies) 102, event stream processing system 100 may ingest one or more event streams 116 via one or more inputs 104, process the event stream(s) 116 in accordance with the query(ies) 102, and generate an output 106. Input(s) 104 may be an application programming interface (API) that is configured to receive event stream(s) 116. As shown in FIG. 1, event stream processing system 100 may include one or more streaming nodes 108. Each of streaming node(s) 108 may be configured to perform one or more processing operations (e.g., operations requested by query(ies) 102). Streaming node(s) 108 may be interconnected to implement the desired processing of event stream(s) 116 ingested via input(s) 104. For simplicity, streaming node(s) 108 are shown as being connected serially. However, the structure of event stream processing system 100 shown in FIG. 1 is provided for purposes of example only, and should not be interpreted as limiting the scope of the techniques disclosed herein. More complex topologies are possible in accordance with the present disclosure.

Each of streaming node(s) 108 may comprise a computing device, such as a stationary computing device or a mobile computing device. Examples of stationary computing devices include, but are not limited to, a desktop computer or PC (personal computer), a server, a computing node in a cloud-based environment, an Internet-of-Things (IoT) device, etc. Examples of mobile computing devices include, but are not limited to, a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.). Each of streaming node(s) 108 may also comprise a computing process executing on a stationary computing device or a mobile computing device.

FIG. 1 also shows some of the components that may be included in a streaming node 108. Specifically, a streaming node 108 is shown with a downstream marshaller 110, a plurality of compute processors 112A-112N (where N is any positive integer), and an upstream marshaller 114. Downstream marshaller 110 may be configured to pull data from an upstream marshaller in a prior streaming node 108. Compute processors 112A-112N may each be configured to perform one or more processing operations, and they may be interconnected in various ways to implement the desired processing of event stream(s) 116. For simplicity, compute processors 112A-112N are shown as being connected serially. Again, however, more complex topologies are possible in accordance with the present disclosure.

One of the processing operations that may be performed by a compute processor (including any of compute processors 112A-112N shown in FIG. 1) is a prediction operation, in which predictive analytics are performed on data events of event stream(s) 116 using a machine learning model to generate a prediction and/or classification (hereinafter referred to as a "score") with respect to the data events. Over time, the machine learning model may be modified, refined, and/or improved based on updated training data (e.g., additional data events). Thus, the version of the machine learning model that is used to score data events received at one particular point in time may differ than the version used at another particular point in time. When trying to reproduce the results of a scoring operation, it is desirable that the right version of the machine learning model is used at the right time to ensure an accurate reproduction of the results. Accordingly, a streaming node 108 may also comprise a machine learning model manager 122, which provides validity information 124 that specifies information about the temporal validity of the different versions of a machine learning model. As will be described in greater detail below, compute processors 112A-112N may use validity information 118 to implement a logical gate that restricts the flow of data events such that the data events are provided to the proper version of the machine learning model at the right time. That is, data events are provided to the version of the machine learning model that is temporally valid with respect to the data events.

Figure 2:
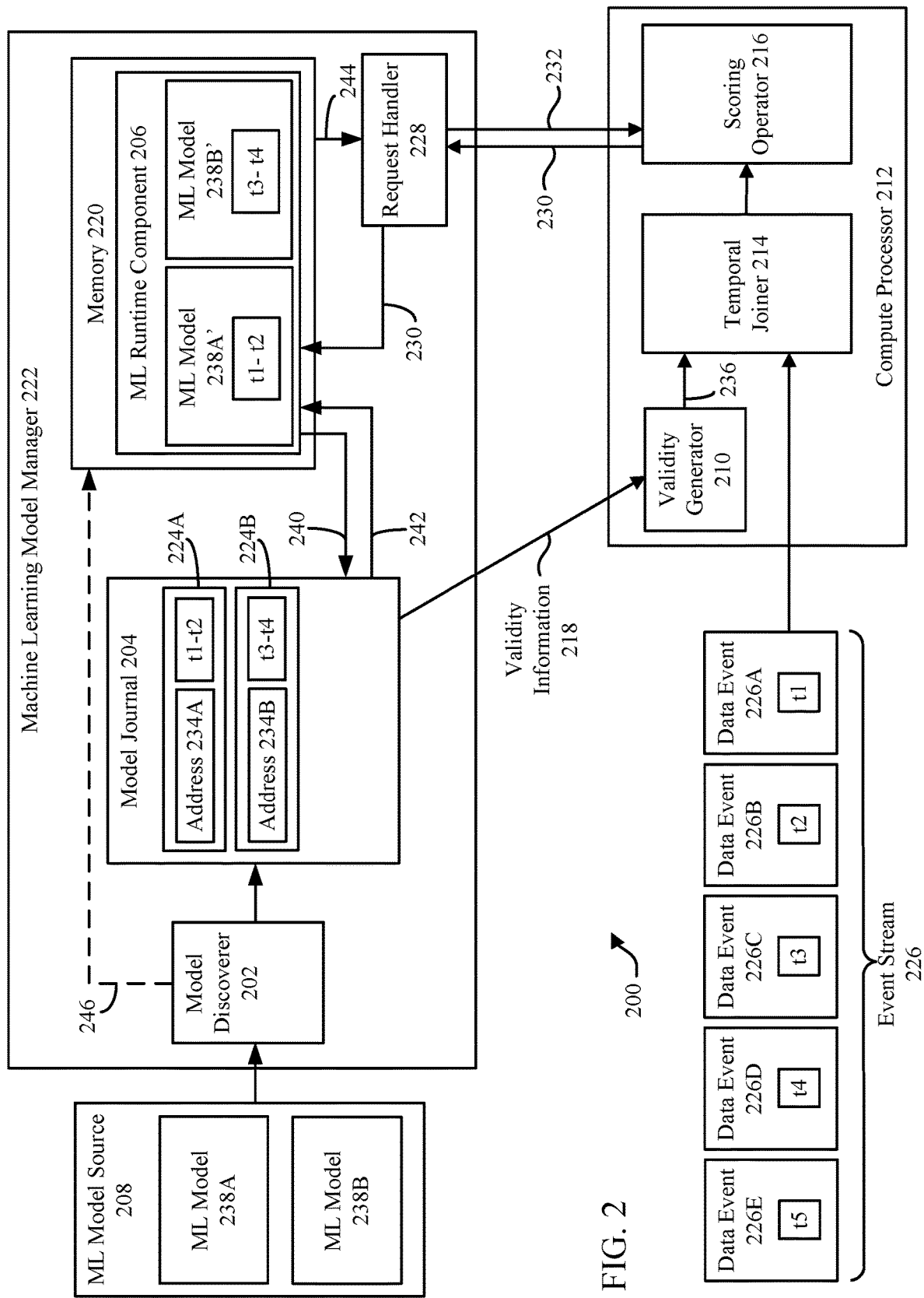
FIG. 2 shows a system for providing data events to a determined version of a machine learning model in accordance with an example embodiment.

FIG. 2 shows a block diagram of a system 200 for providing data events to a determined version of a machine learning model in accordance with an example embodiment. As shown in FIG. 2, system 200 includes a compute processor 212, a machine learning model manager 222, and a machine learning model source 208. Compute processor 212 is an example of any of compute processors 112A-112N, and machine learning model manager 222 is an example machine learning model manager 122, as described above of with reference to FIG. 1. Accordingly, compute processor 212 and machine learning model manager 222 may be included in a streaming node (e.g., streaming node 108). As further shown in FIG. 2, compute processor 212 may include a validity generator 210, a temporal joiner 214, and a scoring operator 216. Machine learning model manager 222 may include a memory 220, a model journal 204, a model discoverer 202, and a request handler 228.

Machine learning model source 208 may comprise one or more versions of a machine learning model. For example, as shown in FIG. 2, machine learning model source 208 stores machine learning models 238A and 238B, where machine learning model 238A is a first version of a machine learning model and machine learning model 238B is a second version of the machine learning model. It is noted that while machine learning model source 208 is depicted as storing two versions of a machine learning model, machine learning model source 208 may store any number of versions. There are many different types of machine learning model sources 208 that may be used in accordance with the present disclosure. For example, in some embodiments, machine learning model source 208 may be a database or data store that stores machine learning models 238. As another example, machine learning models source 208 may be a cloud storage system that stores machine learning models 238. Those skilled in the art will recognize other types of machine learning model sources 208 that may be used in accordance with the present disclosure.

Model discoverer 202 may be configured to discover machine learning models 238 stored in machine learning model source 208. For instance, model discoverer 202 may periodically read machine learning model source 208 to determine machine learning models 238A and 238B and determine whether new versions of machine learning models 238 are stored in machine learning model source 208. Alternatively, machine learning model source 208 may provide an update notification to model discoverer 202 that indicates that a new version of machine learning model 238 has been stored therein. The update notification may also provide an identifier of the new machine learning model. Whenever model discoverer 202 discovers a new machine learning model 238, model discoverer 202 creates a record in model journal 204.

Model journal 204 may include a plurality of records 224A-224B, each corresponding to a particular version of a machine learning model 238. For example, record 224A corresponds to machine learning model 238A, and record 224B corresponds to machine learning model 238B. Records 224A-224B may include address information 234A-234B indicating where the corresponding machine learning model may be found in machine learning model source 208 (or another location). Each of records 224A-224B is also associated with a valid time range that indicates the time range in which a corresponding machine learning model version is valid. In the depicted example, machine learning model 238A is associated with a valid time range of t1-t2, and machine learning model 238B is associated with a valid time range of t3-t4.

In the examples discussed herein, all references to ti (where i is any integer) are referring to a point in time. Unless otherwise specified, tx occurs earlier in time than ty if y>x. For example, t1 occurs earlier in time than t2. However, the difference between two different time values (e.g., the difference between t2 and t1) should not be interpreted as corresponding to any particular time interval. The difference between tx and ty may be the same as or different than the difference between ty and tz. For example, the difference between t2 and t1 may be the same as or different than the difference between t3 and t2.

Model discoverer 202 may determine the valid time range for a particular record of records 224A-224B in many ways. For instance, each of machine learning models 238A-238B may be associated with metadata that specifies the valid time range. In another example, the valid time range for each of machine learning models 238A-238B may be specified within a file name corresponding to the machine learning model. In yet another example, the valid time range may be specified via the update notification provided by machine learning model source 208. It is noted that the techniques described above for determining the valid time range by model discoverer 202 are purely exemplary and that other techniques may be utilized to determine the valid time range for a particular machine learning model.

Event stream 226 includes time series data. More specifically, event stream 226 includes a plurality of data events 226A-226E. Each of the data events 226A-226E may be associated with a timestamp. When compute processor 212 receives a particular data event, temporal joiner 214 may be configured to perform a temporal join operation, in which a determination is made as to whether a temporally valid machine learning model is available to perform a scoring operation with respect to the data event. The foregoing may be achieved via a punctuation event 236 received via validity generator 210.

Validity generator 210 may be configured to periodically read the timestamp associated with each of records 224A-224B of model journal 204 to determine validity information 218 indicative of the latest period in time for which there is a valid machine learning model of machine learning models 238A-238B. Alternatively, model journal 204 may provide a notification including validity information 218 to validity generator 210 each time a new record is added. Validity information 218 is an example of validity information 118, as described above with reference to FIG. 1. In the example shown in FIG. 2, validity generator 210 may determine that the latest period in time for where there is a valid machine learning model is t4. Accordingly, validity generator 210 may generate a punctuation event 236 specifying information about the temporal validity of machine learning models 238A-238B based on validity information 218. In particular, punctuation event 236 may comprise a timestamp (e.g., t4) that indicates a latest time period for which there is a temporally valid machine learning model from the plurality of machine learning models 238A-238B. In the depicted example, machine learning model 238B is determined to be temporally valid.

Temporal joiner 214 utilizes punctuation events 236 to implement a logical gate that that restricts the flow of data events 226A-226E such that data events 226A-226E are provided to the proper version of the machine learning model. The logical gate may be implemented as a temporal join between event stream 226 and punctuation events 236. The temporal join operation is logically placed prior to the score operation in compute processor 212. In other words, compute processor 212 is configured so that event stream 226 is processed by temporal joiner 214 before being processed by scoring operator 216. As a result of the temporal join operation, the scoring operation is only performed on data events for which there is a temporally valid machine learning model in machine learning model source 208.

In particular, each of data events 226A-226E in event stream 226 having a timestamp that is greater than the timestamp in the most recent punctuation event 236 (which, as indicated above, corresponds to the highest timestamp associated with machine learning models 238A-238B in machine learning model source 208) is prevented from crossing the logical gate to the scoring operation performed by scoring operator 216. Such data events are held by temporal joiner 214 until a punctuation event 236 is received that indicates that another machine learning model version is temporally valid. However, each data event in event stream 226 having a timestamp that is less than or equal to the timestamp in the most recent punctuation event 236 is allowed to cross the logical gate and proceed to the scoring operation performed scoring operator 216.

In the example shown in FIG. 2, data events 226A-226D would proceed to the scoring operation of scoring operator 216, as their timestamps are less than or equal to the timestamp specified by the latest punctuation event 236 (i.e. t4). However, data event 226E, which is associated with a timestamp of t5, would not immediately proceed to the scoring operation of scoring operator 216. Temporal joiner 214 would prevent data event 226E from proceeding to the scoring operation until temporal joiner 214 receives a punctuation event 236 having a timestamp of (at least) t5, thereby indicating that a machine learning model is temporally valid for the time t5 is stored in machine learning model source 208. Data event 226E would be held by compute processor 212 until a punctuation event 236 is received that indicates that another machine learning model version is temporally valid.

Scoring operator 216 may be configured to provide a scoring request 230 for each data event that is to be scored by a corresponding machine learning model of machine learning models 238A and 238B. Scoring request 230 may comprise the data event allowed to pass the logical gate (implemented via temporal joiner 214) and/or the timestamp associated therewith. Scoring request 230 may be received by a request handler 228 within machine learning model manager 222. Request handler 228 may provide scoring request 230 to a machine learning runtime component 206 executing in a memory 220 managed by machine learning model manager 222.

Machine learning runtime component 206 may be configured to retrieve a machine learning model from machine learning model source 208 that is temporally valid based on the timestamp included in scoring request 230 and load the temporally valid machine learning model into memory 220.

For instance, when scoring operator 216 receives data event 226A, scoring operator 216 provides data event 226A and its timestamp to request handler 228 via scoring request 230, and request handler 228 provides scoring request 230 to machine learning runtime component 206. Machine learning runtime component 206 may determine the timestamp associated with data event 226A (i.e., t1) and query model journal 204 based on the timestamp. For instance, machine learning runtime component 206 may provide a query 240 that specifies the timestamp. Model journal 204 may return a response 242 that specifies the address at which the corresponding machine learning model is located in machine learning model source 208. Continuing with the example above with reference to data event 226A, response 242 may specify address 234A, which is the address at which machine learning model 238A is located in machine learning model source 208. Using address 234A, machine learning runtime component 206 retrieves machine learning model 238A from machine learning model source 208 and loads machine learning model 238A into memory 220 (shown as machine learning model 238A').

Thereafter, machine learning model 238A' analyzes data event 226A and performs a scoring operation with respect to data event 226A to generate a score 244. Generated score 244 is provided to request handler 228, which provides score 244 to scoring operator 216 via a scoring response 232.

When scoring operator 216 receives data event 226B, scoring operator 216 provides data event 226B and/or its timestamp to request handler 228 via scoring request 230, and request handler 228 provides scoring request 230 to machine learning runtime component 206. Machine learning runtime component 206 may determine the timestamp associated with data event 226B (i.e., t2) and determine that the machine learning model that is temporally valid for data event 226B (i.e., machine learning model 238A) is already loaded in memory 220. Thus, machine learning runtime component 206 is not required to retrieve machine learning model 238A from machine learning model source 208.

Thereafter, machine learning model 238A' analyzes data event 226B and performs a scoring operation with respect to data event 226B to generate a score (e.g., score 244). The generated score is provided to request handler 228, which provides the score to scoring operator 216 via a scoring response 244.

When scoring operator 216 receives data event 226C, scoring operator 216 provides data event 226C and/or its timestamp to request handler 228 via scoring request 230, and request handler 228 provides scoring request 230 to machine learning runtime component 206. Machine learning runtime component 206 may determine the timestamp associated with data event 226C (i.e., t3) and determine that a temporally valid machine learning model is not loaded into memory 220. Thus, machine learning runtime component 206 may query model journal 204 (e.g., via query 240) based on the timestamp of data event 226C. Model journal 204 may return a response (e.g., response 242) that specifies the address at which the corresponding machine learning model is located in machine learning model source 208 (i.e., address 234B). Using address 234B, machine learning runtime component 206 retrieves machine learning model 238B from machine learning model source 208 and loads machine learning model 238B into memory 220 (shown as machine learning model 238B').

Thereafter, machine learning model 238B' analyzes data event 226C and performs a scoring operation with respect to data event 226C to generate a score (e.g., score 244). The generated score is provided to request handler 228, which provides the score to scoring operator 216 via a scoring response 232.

When scoring operator 216 receives data event 226D, scoring operator 216 provides data event 226D and/or its timestamp to request handler 228 via scoring request 230, and request handler 228 provides scoring request 230 to machine learning runtime component 206. Machine learning runtime component 206 may determine the timestamp associated with data event 226D (i.e., t4) and determine that the machine learning model that is temporally valid for data event 226D (i.e., machine learning model 238B) is already loaded in memory 220. Thus, machine learning runtime component 206 is not required to retrieve machine learning model 238B from machine learning model source 208.

Thereafter, machine learning model 238B' analyzes data event 226D and performs a scoring operation with respect to data event 226D to generate a score (e.g., score 244). The generated score is provided to request handler 228, which provides the score to scoring operator 216 via a scoring response 232.

As a result of the temporal join operation, data event 226E, which is associated with a timestamp of t5, would not immediately proceed to the scoring operator. Temporal joiner 214 would prevent data event 226E from proceeding to the scoring operation until temporal joiner 214 receives a punctuation event 236 having a timestamp of (at least) $t_5$, thereby indicating that machine learning model source 208 has a temporally valid machine leering model that is valid for time t5.

In accordance with an embodiment, model discoverer 202 may cause machine learning runtime component 206 to preload a machine learning model into memory 220 responsive to model discoverer 202 discovering a new machine learning model (rather than loading a machine learning model responsive to receiving scoring request 230). In particular, it may be anticipated that a newly-added machine learning model is to be utilized to process a data event in the near future. In response to detecting a new machine learning model version, model discoverer 202 may provide a load request 246 to machine learning runtime component 206. Load request 246 may specify the address at which the newly-discovered machine learning model is located within machine learning model source 208. Responsive to receiving load request 246, machine learning runtime component 206 may retrieve the machine learning model located at the address specified via load request 246 and load the machine learning model in memory 220. Such a technique advantageously reduces the latency for processing data events. In particular, the machine learning model will already be loaded in memory by the time (or near the time) the relevant data event(s) are provided to machine learning runtime component 206, thereby enabling the data event(s) to be processed immediately (rather than having to wait for the machine learning model to be loaded responsive to receiving a scoring request 230).

Compute processor 212 and machine learning model manager 222 may be time synchronized such that any timestamp that is exchanged between those entities will be interpreted by both entities as referring to the same point in time. For example, if the machine learning model manager 222 provides validity information 218 that specifies time tN to compute processor 212, both machine learning model manager 222 and compute processor 212 interpret tN as referring to the same point in time. In fact, referring briefly to event stream processing system 100 shown in FIG. 1, all of compute processors 112A-112N within a streaming node 108 may be time synchronized. In some embodiments, all of streaming nodes 108 within event stream processing system 100 may be time synchronized.

Figure 3:
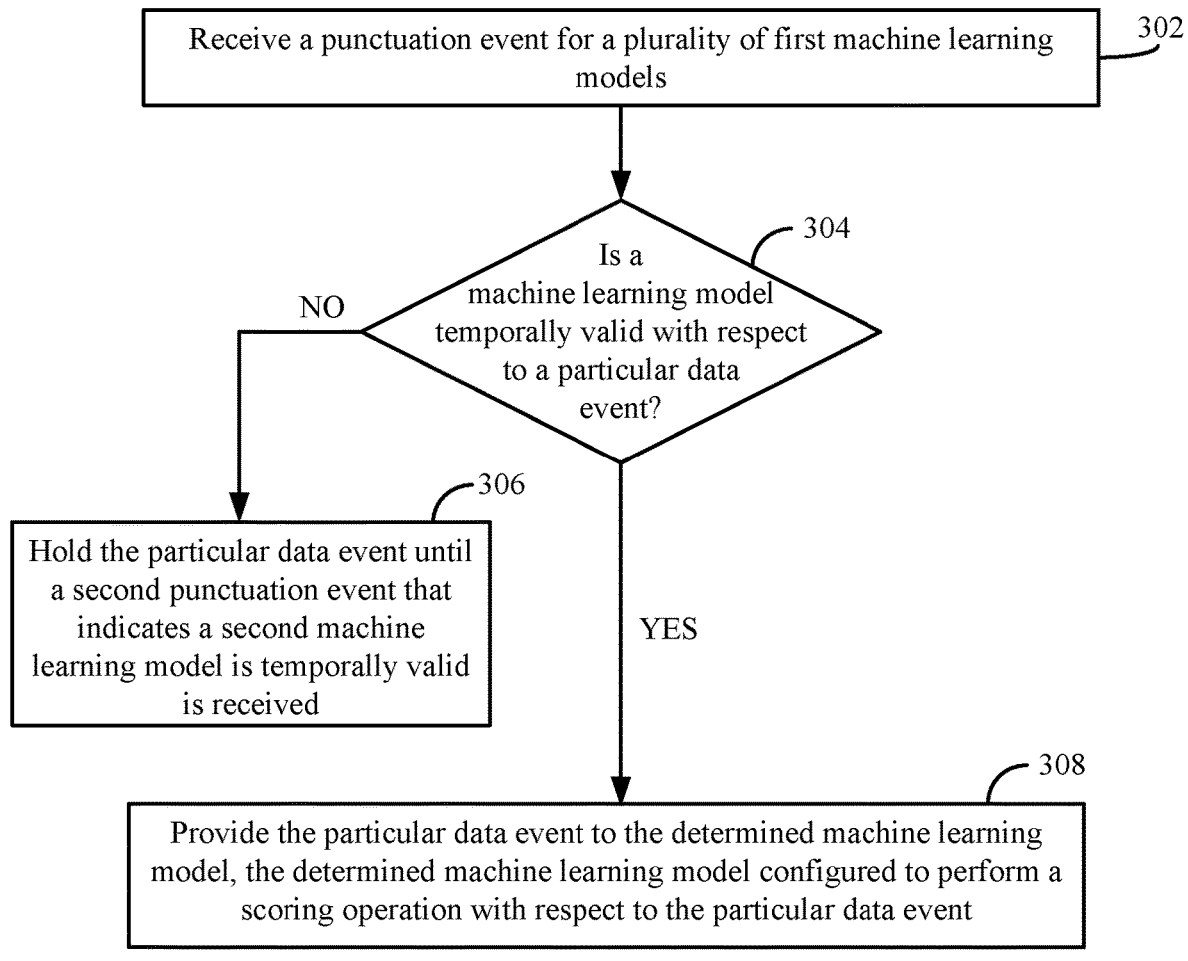
FIG. 3 shows a flowchart of a method in a streaming node for determining a machine learning model for an event stream, according to an example embodiment.

Accordingly, data events may be provided to a particular version of a machine learning model in many ways. For example, FIG. 3 shows a flowchart 300 of a method in a streaming node for determining a machine learning model for an event stream, according to an example embodiment. In an embodiment, flowchart 300 may be implemented by a compute processor of a streaming node, such as by compute processor 212, as shown in FIG. 2. Accordingly, flowchart 300 will be described with continued reference to FIG. 2. Other structural and operational embodiments will be apparent to persons skilled in the relevant art(s) based on the following discussion regarding flowchart 300 and system 200 of FIG. 2.

Flowchart 300 of FIG. 3 begins with step 302. In step 302, a punctuation event for a plurality of first machine learning models is received. For example, with reference to FIG. 2, temporal joiner 214 may receive a punctuation event 236 for machine learning models 238A-238B from validity generator 210.

In accordance with one or more embodiments, the punctuation event is received based on a machine learning model journal that maintains a time range for each of the first machine learning models, each time range specifying a range of time in which a corresponding machine learning model of the first machine learning models is valid. For example, with reference to FIG. 2, punctuation event 236 is based on validity information 218 received via model journal 204. Model journal 204 maintains a time range (or timestamp) for each of machine learning models 238A-238B in records 224A-224B. For instance, as shown in FIG. 2, record 224A stores a time range of t1-t2, which specifies a range of time in which machine learning model 238A is valid. Record 224B stores a time range of t3-t4, which specifies a range of time in which machine learning model 238B is valid.

In accordance with one or more embodiments, the machine learning model journal is populated with the time range for each of the first machine learning models by a discovery entity configured to discover machine learning models that are available for performing scoring operations with respect to the event stream. For example, with reference with FIG. 2, model journal 204 is populated with the time range for each of machine learning models 238A-238B by model discoverer 202 that is configured discover machine learning models that are available via machine learning model source 208.

In accordance with one or more embodiments, at least one of the machine learning model journal or the discovery entity are maintained by an entity external to the streaming node. For example, with reference to FIG. 2, model journal 204 and/or model discoverer 202 may be maintained by an entity external to the streaming node (i.e., external to compute process 212 and/or machine learning model manager 222). Such an embodiment is described below with reference to FIG. 7.

In step 304, a determination is made as to whether a machine learning model of the first machine learning models is temporally valid with respect to a particular data event of the event stream based on the punctuation event. If a determination is made that the machine learning model is temporally valid, flow continues to step 306. Otherwise, flow continues to step 308. For example, with reference to FIG. 2, temporal joiner 214 may determine whether a machine learning model of machine learning models 238A-238B is temporally valid with respect to a data event 226A-226E of event stream 226 based on punctuation event 236.

In accordance with one or more embodiments, the punctuation event comprises a first timestamp that indicates a latest time period for which there is a temporally valid machine learning model of the machine learning, and each data event of the event stream comprises a second timestamp. For example, with reference to FIG. 2, punctuation event 236 comprises a timestamp that indicates a latest time period for which there is a temporally valid machine learning model. For instance, validity information 218 may specify a time range of t4, which is the latest time period for which there is a temporally valid machine learning model (i.e., machine learning model 238B). Based on validity information 218, punctuation event 236 may specify a timestamp corresponding to t4. As also shown in FIG. 2, each of data events 226A-226E is associated with a particular timestamp. For instance, data event 226A is associated with a timestamp of t1, data event 226B is associated with a timestamp of t2, data event 226C is associated with a timestamp of t3, data event 226D is associated with a timestamp of t4, and data event 226E is associated with a timestamp of t5.

Temporal joiner 214 may determine whether a machine learning model of machine learning models 238A-238B is temporally valid for a particular data event of data events 226A-226E based on the timestamp of punctuation event 236 and the timestamp of the data event being processed. Additional details regarding determining whether a machine learning model is temporally valid for a particular data event is described below with reference to FIG. 4.

At step 306, the particular data event is provided to the determined machine learning model, the determined machine learning model configured to perform a scoring operation with respect to the particular data event. For example, with reference to FIG. 2, the particular data event (e.g., one of data events 226A-226E) and/or its associated timestamp is provided to machine learning runtime component 206 via scoring request 230. Request handler 228 provides scoring request 230 to machine learning runtime component 206. Machine learning runtime component 206 provides the data event to the determined machine learning model loaded into memory 220 based on the data event's timestamp (i.e., either machine learning model 238A' or machine learning model 238B' depending on the which model is temporally valid for the particular data event in accordance with its timestamp).

At step 308, the particular data event is held until a second punctuation event that indicates that a second machine learning model is temporally valid is received. For example, with reference to FIG. 2, temporal joiner 214 may hold the particular data event until a second punctuation event 236 indicating that a second machine learning model is temporally valid is received. For instance, data event 226E may be held until a machine learning model that is temporally valid for time t5 is stored in machine learning model source 208.

Figure 4:
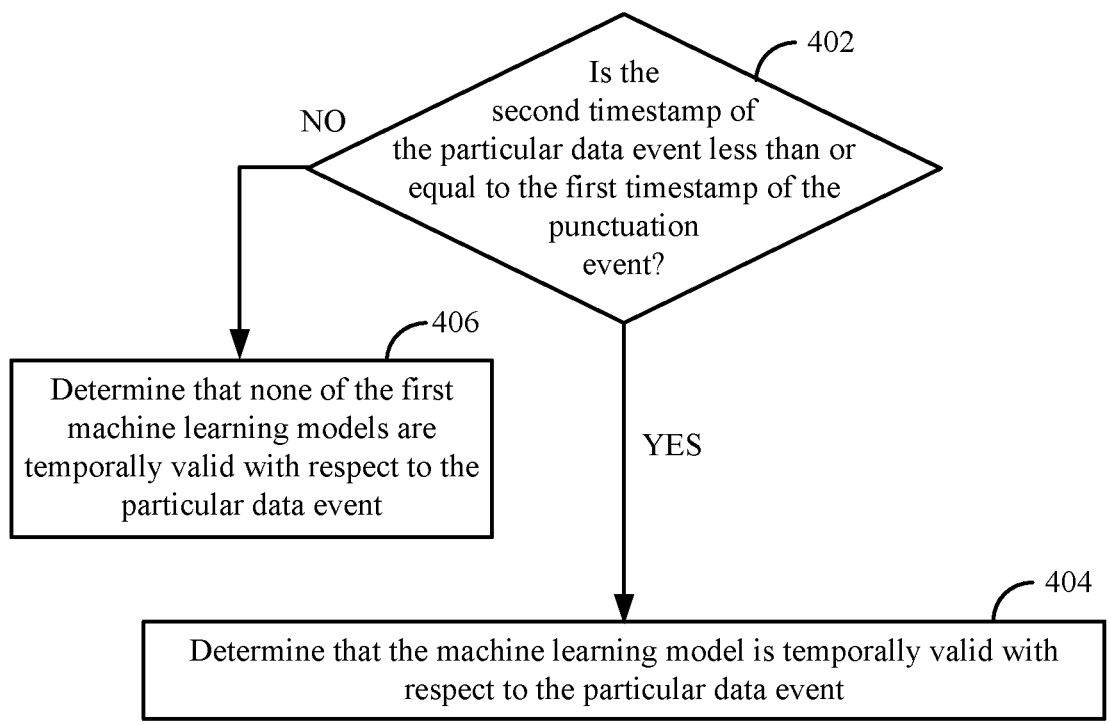
FIG. 4 shows a flowchart of a method for determining whether a machine learning model is temporally valid with respect to a particular data event, according to an example embodiment.

FIG. 4 shows a flowchart 400 of a method for determining whether a machine learning model is temporally valid with respect to a particular data event, according to an example embodiment. In an embodiment, flowchart 400 may be implemented by a compute processor of a streaming node, such as by compute processor 212, as shown in FIG. 2. Accordingly, flowchart 400 will be described with continued reference to FIG. 2. Other structural and operational embodiments will be apparent to persons skilled in the relevant art(s) based on the following discussion regarding flowchart 400 and system 200 of FIG. 2.

Flowchart 400 of FIG. 4 begins with step 402. In step 402, a determination is made as to whether the second timestamp of the particular data event is less than or equal to the first timestamp of the punctuation event. If a determination is made that the second timestamp is less than or equal to the first timestamp, flow continues to step 404. Otherwise, flow continues to step 406. For example, with reference to FIG. 2, temporal joiner 214 is configured to determine whether the second timestamp of the particular data event of data events 226A-226E being processed is less than or equal to the first timestamp of punctuation event 236.

In step 404, a determination is made that the determined machine learning model is temporally valid with respect to the particular data event. For example, with reference to FIG. 2, temporal joiner 214 determines that the machine learning model is temporally valid with respect to the particular data event. For instance, for data events 226A-226B, temporal joiner 214 determines that machine learning model 238A is temporally valid, and therefore data events 226A-226B are provided to machine learning model 238A'. For data events 226C-226D, temporal joiner 214 determines that machine learning model 238B is temporally valid, and therefore data events 226C-226D are provided to machine learning model 238B'.

In step 406, a determination is made that none of the first machine learning models are temporally valid with respect to the particular data event. For example, with reference to FIG. 2, temporal joiner 214 determines that none of the first machine learning models are temporally valid with respect to the particular data event. For instance, for data event 226E, temporal joiner 214 determines that none of machine learning models 238A-238B are temporally valid.

In accordance with one or more embodiments, older machine learning models loaded into memory 220 that are no longer needed may be deleted from memory 220. The decision to delete one or more older machine learning models from memory 220 may be based at least in part on scoring requests 230 that scoring operator 216 sends to request handler 228.

Figure 5:
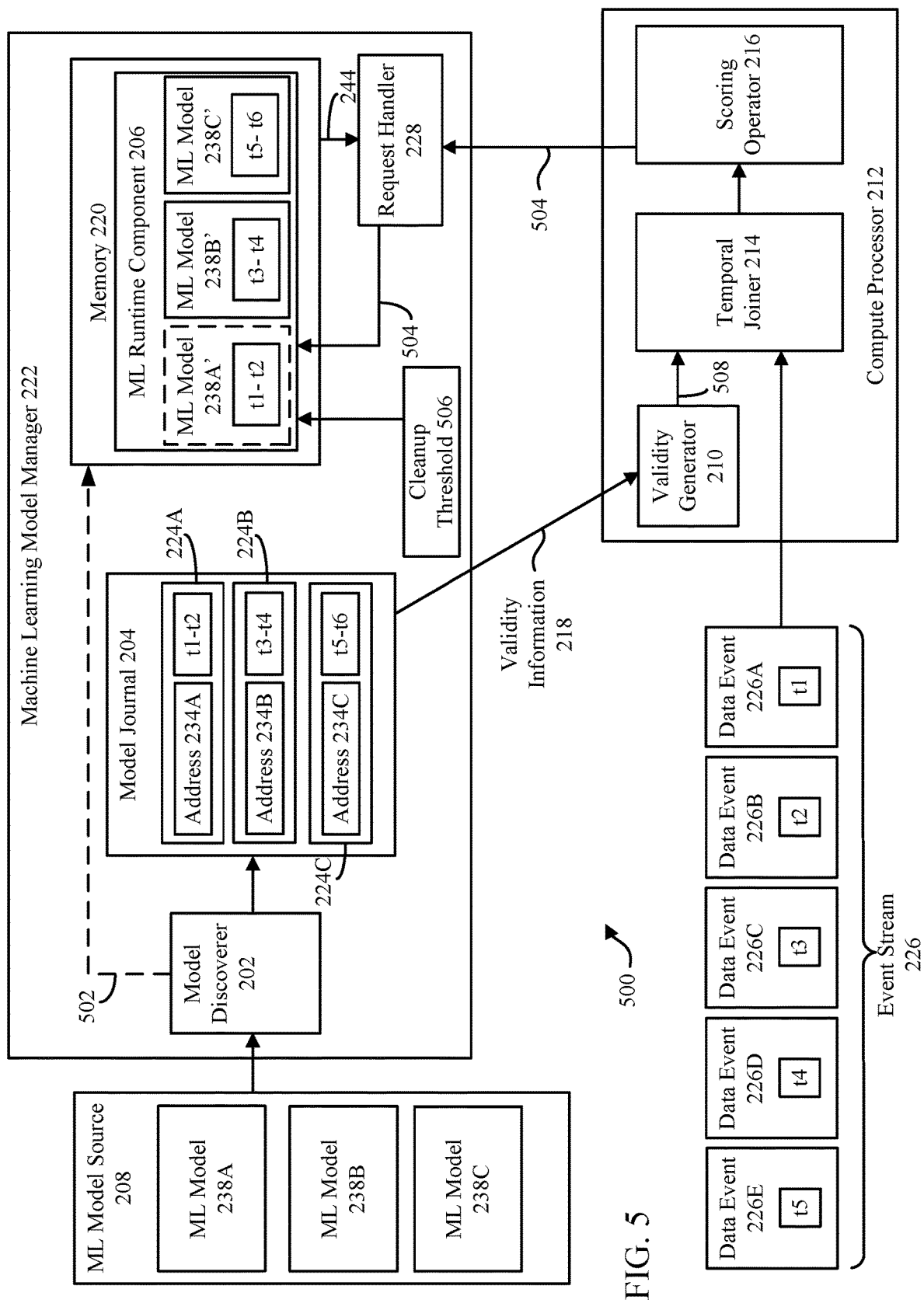
FIG. 5 shows a block diagram of a system for deleting older machine learning models from a memory in accordance with an example embodiment.

FIG. 5 shows a block diagram of a system 500 for deleting older machine learning models from a memory in accordance with an example embodiment. As shown in FIG. 2, system 500 includes compute processor 212, machine learning model manager 222, and machine learning model source 208, as described above with reference to FIG. 2. As shown in FIG. 5, machine learning model source 208 stores an additional version of a machine learning model (i.e., machine learning model 238C). Accordingly, model discoverer 202 discovers machine learning model 238C and adds a record 224C in model journal that includes an address 234C at which machine learning model 238C is located within machine learning model source 208 and/or a valid time range that indicates the time range in which machine learning model 238C is valid (e.g., t5-t6). As further shown in FIG. 5, machine learning model 238C is loaded into memory 220 (shown as machine learning model 238C'). Machine learning model 238C' may be loaded into memory 220 responsive to machine learning runtime component 206 receiving a load request from model discoverer 202 (e.g., load request 502). Alternatively, machine learning model 238C' may be loaded into memory 220 responsive to receive a scoring request from scoring operator 216 (e.g., scoring request 504).

The decision to delete a machine learning model from memory 220 may be based on the difference between (i) the timestamp associated with the data event included scoring request 230, and (ii) the end time of the valid time range associated with that machine learning model. If this difference is greater than a predefined threshold value (hereinafter referred to as a cleanup threshold (shown as cleanup threshold 506), then machine learning runtime component 206 may delete that machine learning model from memory 220. For example, as shown in FIG. 5, responsive to receiving data event 226E, temporal joiner 214 may determine whether a temporally valid machine learning model is available based on punctuation event 508. Punctuation event 508 may comprise a timestamp (e.g., t5) that indicates a latest time period for which there is a temporally valid machine learning model from the plurality of machine learning models 238A-238C. The timestamp is based on validity information 218, as described above with reference to FIG. 2. In the present example, because the timestamp associated with data event 226E is equal to the timestamp specified by punctuation event 508 (i.e., they are both t5), temporal joiner 214 allows data event 226E to proceed to scoring operator 216. Scoring operator 216 generates scoring request 504 comprising data event 226E and its associated timestamp. Scoring request 504 is provided to request handler 228. The end time associated with the oldest machine learning model in machine learning model source 208 is t2. If the difference between the timestamp associated with data event 226E (i.e., t5) and the end time of the valid time range associated with the oldest machine learning model (i.e., t2) is greater than cleanup threshold 506, then this machine learning model (i.e., machine learning model 238A') may be deleted from memory 220 by machine learning runtime component 206. Accordingly, machine learning model 238A' is shown in dotted lines to indicate that it is being deleted from memory 220.

III. Additional Example Embodiments

In accordance with an embodiment, a streaming node may be configured to receive a plurality of different event streams. Each of the event streams may be processed by the same copy of a machine learning model. Given that machine learning models are very large in size (e.g., 100s of MB), using a single machine learning model to process a plurality of event streams advantageously saves a large amount of memory, as only a single machine learning model is loaded into memory. Such an embodiment is described below with reference to FIG. 6.

Figure 6:
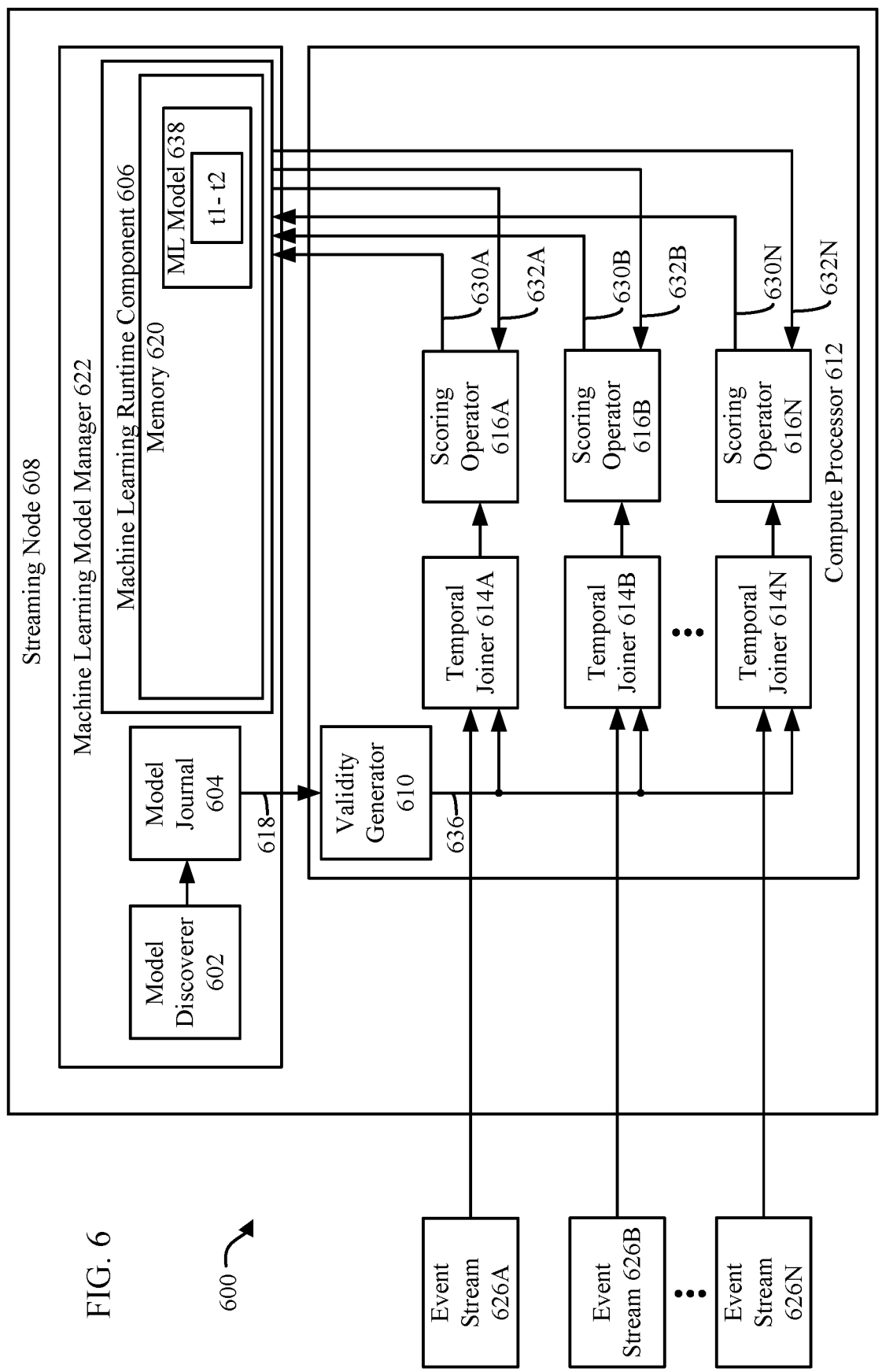
FIG. 6 shows a block diagram of a system for processing a plurality of different data streams via the same machine learning model in accordance with an example embodiment.

FIG. 6 shows a block diagram of a system 600 for processing a plurality of different data streams via the same machine learning model in accordance with an example embodiment. As shown in FIG. 6, system 600 includes a streaming node 608 that is configured to receive one or more event streams 626A-626N, where N is any positive integer. Streaming node 608 is an example of streaming node 108, as described above with reference to FIG. 1. Streaming node 608 may comprise a compute processor 612 and a machine learning model manager 622. Compute processor 612 and machine learning model manager 622 are examples of compute processor 212 and machine learning model manager 622, as described above with reference to FIGS. 2 and 5. Machine learning model manager 622 may comprise a model discoverer 602, model journal 604 and a machine learning runtime component 606, which manages a memory 620. Model discoverer 602, model journal 604, machine learning runtime component 606, and memory 620 are examples of model discoverer 202, model journal 204, machine learning runtime component 206, and memory 220, as described above with reference to FIGS. 2 and 5. As shown in FIG. 6, machine learning runtime component 606 has loaded a temporally valid machine learning model 638 into memory 620. Machine learning model 638 is an example of any of machine learning models 238A-238C, as described above with reference to FIGS. 2 and 5. Machine learning model 638 may be loaded into memory 620 in accordance with any of the embodiments described herein. It is noted machine learning model manager 622 may comprise other components described above with reference to FIGS. 2 and 5, but are not described here for sake of brevity.

As further shown in FIG. 6, compute processor 612 comprises a validity generator 610, temporal joiners 614A-614N, and scoring operators 616A-616N. Validity generator 610 is an example of validity generator 210, each of temporal joiners 614A-614N are an example of temporal joiner 214, and each of scoring operators 616A-616N are an example of scoring operator 616. Temporal joiner 614A is configured to perform a temporal join operation based on data events of event stream 626A and a punctuation event 636 received via validity generator 610. Validity generator 610 may generate punctuation event 636 based on validity information 618 received via model journal 604 populated by model discoverer 602 in accordance with the embodiments described herein. Temporal joiner 614B is configured to perform a temporal join operation based on data events of event stream 626B and punctuation event 636. Temporal joiner 614N is configured to perform a temporal join operation based on data events of event stream 626N and punctuation event 636. Punctuation event 636 is an example of punctuation event 236 or punctuation event 508, as described above with reference to FIGS. 2 and 5. Temporal joiner 614A provides data event(s) of event stream 626A for which a temporally valid machine learning model is available to scoring operator 616A based on the temporal join operator performed by scoring operator 616A. Temporal joiner 614B provides data event(s) of event stream 626B for which a temporally valid machine learning model is available to scoring operator 616B based on the temporal join operator performed by temporal joiner 614B. Temporal joiner 614N provides data events(s) of event stream 626N for which a temporally valid machine learning model is available to scoring operator 616N based on the temporal join operator performed by temporal joiner 614N.

In the example shown in FIG. 6, machine learning model 638 is temporally valid for data events of event streams 626A-626N having a time stamp of t1 or t2. Accordingly, scoring operator 616A provides a scoring request 630A for data events of event streams 626A having a timestamp of t1 or t2, each of scoring operator 616B provides a scoring request 630B for data events of event streams 626B having a timestamp of t1 or t2, and scoring operator 616N provides a scoring request 630N for data events of event streams 626N having a timestamp of t1 or t2. Each of scoring requests 630A-630N are provided to the same temporally-valid machine learning model loaded in memory 620 (i.e., machine learning model 638). Machine learning model 638 performs a predictive analysis on the received data events and provides a scoring response comprising a score to the scoring operator that made the scoring request. For example, machine learning model 638 provides a scoring response 632A to scoring operator 616A, provides a scoring response 632B to scoring operator 616B, and provides a scoring response 632N to scoring operator 616N. Accordingly, a single machine learning model is utilized to score temporally valid data events from different event streams 626A-626C.

In accordance with an embodiment, machine learning model manager 622 and/or certain components thereof may be located in an entity external to streaming node 608. For example, machine learning model manager 622, model discoverer 622 and/or model journal 604 may be located in the external entity. By doing so, machine learning model manager 622, model journal 604 and/or model discoverer 602 may be centralized such that a plurality of different streaming nodes may utilize the same validity information 618. This advantageously reduces the processing and power requirements for a streaming node 608. Such an embodiment is shown in FIG. 7.

Figure 7:
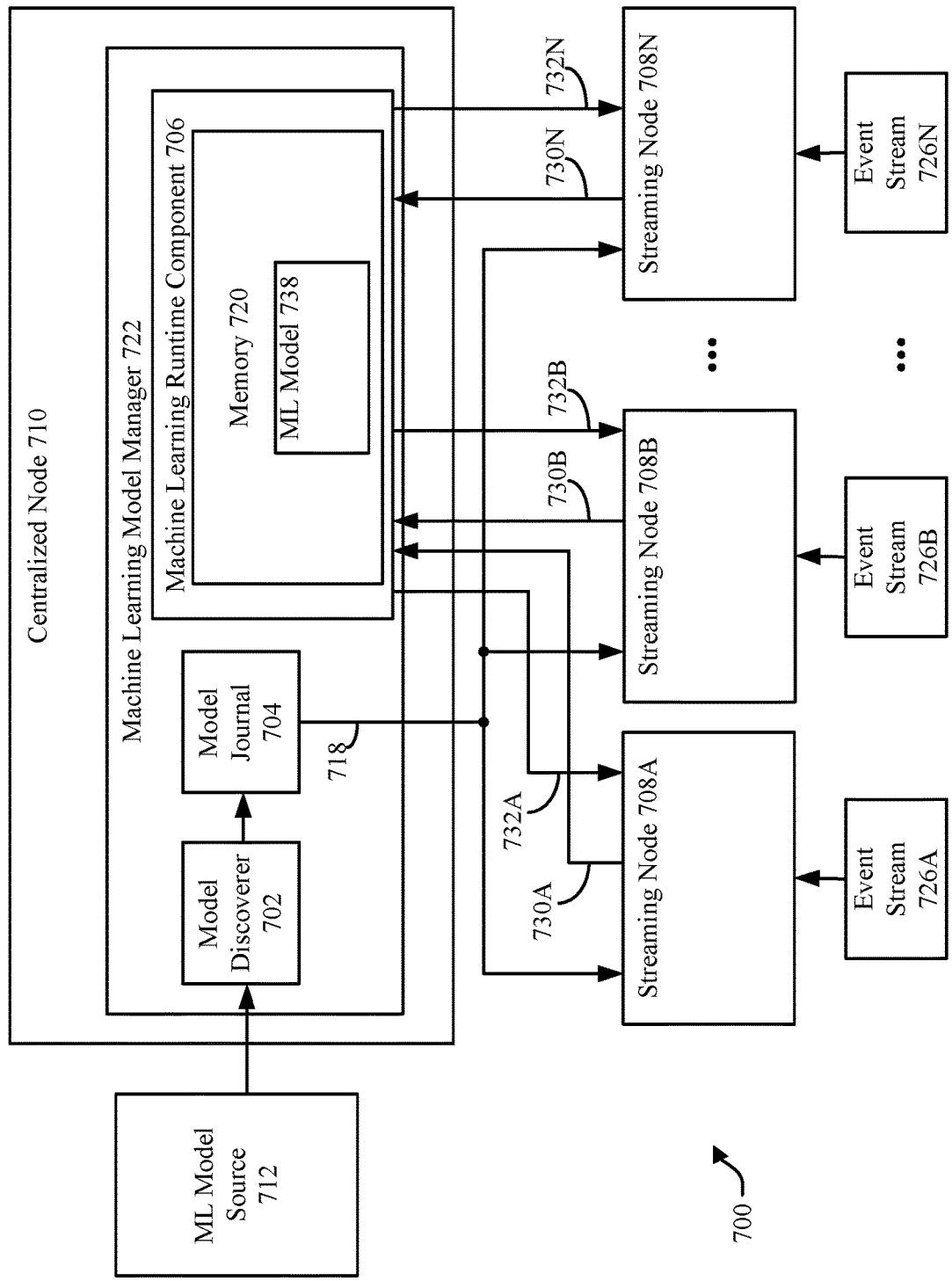
FIG. 7 shows a block diagram of a system for determining a temporally valid machine learning model for processing data events using a centralized machine learning model manager in accordance with an example embodiment.

FIG. 7 shows a block diagram of a system 700 for determining a temporally valid machine learning model for processing data events using a centralized machine learning model manager in accordance with an example embodiment. As shown in FIG. 7, system 700 includes one or more streaming nodes 708A-708N, a centralized node 710, and a machine learning model source 712. Each of streaming nodes 708-708N are an example of streaming node 108 or streaming node 608, as described above with reference to FIGS. 1 and 6. Machine learning model source 712 is an example of machine learning model source 208, as described above with reference to FIG. 2. Centralized node 710 includes machine learning model manager 722, which is an example of machine learning model manager 222, as described above with reference to FIGS. 2, 5, and 6.

Machine learning model manager 722 comprises model discoverer 702, model journal 704, and machine learning runtime component 706. Machine learning runtime component 706 is configured to load machine learning model(s) 738 stored in machine learning model source 712 into memory 720. Model discoverer 702, model journal 704, machine learning runtime component 706, memory 720, and machine learning model 738 are examples of model discoverer 202, model journal 204, machine learning runtime component 206, memory 220, and machine learning model 238, as described above with reference to FIGS. 2, 5, and 6.

Centralized node 710 may comprise a computing device, such as a stationary computing device or a mobile computing device. Examples of stationary computing devices include, but are not limited to, a desktop computer or PC (personal computer), a server, a computing node in a cloud-based environment, an Internet-of-Things (IoT) device, etc. Examples of mobile computing devices include, but are not limited to, a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.).

Streaming node 708A is configured to receive event stream 726A, streaming node 708B is configured to receive event stream 726B, and streaming node 708N is configured to receive event stream 726N. Each of streaming nodes 708A-708N are configured to perform a temporal join operation based on validity information 718 received via model journal 704 of centralized node 710 and respective timestamps associated with data events received via its respective event stream. Each of streaming nodes 708A-708N are configured to perform the temporal join operation in accordance with the embodiments described herein. Streaming node 708A is configured to provide a scoring request 730A for data events of event stream 726A that are determined to be temporally valid with respect to machine learning models stored in machine learning model source 712. Streaming node 708B is configured to provide a scoring request 730B for data events of event stream 726B that are determined to be temporally valid with respect to machine learning models stored in machine learning model source 712. Streaming node 708N is configured to provide a scoring request 730N for data events of event stream 726N that are determined to be temporally valid with respect to machine learning models stored in machine learning model source 712. Each of scoring requests 730A-730N are provided to machine learning runtime component 706 of centralized node 710. A temporally valid machine learning model loaded into memory 720 (e.g., machine learning model 738) scores the data events received via scoring request 730A and provides a scoring response 732A to streaming node 708A, scores the data events received via scoring request 730B and provides a scoring response 732B to streaming node 708B, and scores the data events received via scoring request 730N and provides a scoring response 732N to streaming node 708N.

Validity information 718 is an example validity information 218 and validity information 618, as described above with reference to FIGS. 2, 5, and 6. Each of scoring requests 730A-730N are examples of scoring request 230, scoring request 504, and scoring requests 630A-630N, as described above with reference to FIGS. 2, 5, and 6. Each of scoring responses 732A-732N are examples of scoring response 232 and scoring responses 632A-632N, as described above with reference to FIGS. 2 and 6.

It is noted that certain components of machine learning model manager 722 may not be located in centralized node 710, such as, but not limited to, machine learning runtime component 706, memory 720, and machine learning model 738. Instead, such components may be located in each of streaming nodes 708A-708N.

IV. Example Computer System Implementation

Event stream processing system 100, streaming node 108, machine learning model manager 122, downstream marshaller 110, compute processors 112A-112N, upstream marshaller 114, machine learning model source 208, compute processor 212, machine learning model manager 222, model journal 204, memory 220, machine learning runtime component 206, request handler 228, validity generator 210, temporal joiner 214, scoring operator 216, machine learning models 238A-238B, cleanup threshold 506, streaming node 608, machine learning model manager 622, model discoverer 602, model journal 604, machine learning runtime component 606, memory 620, machine learning model 638, compute processor 612, validity generator 610, temporal joiners 614A-614N, scoring operators 616A-616N, machine learning model source 712, centralized node 710, machine learning model manager 722, model discoverer 702, model journal 704, machine learning runtime component 706, memory 720, machine learning model 738, and/or streaming nodes 708A-708N (and/or any of the components described therein), and/or flowchart 300 and/or 400, may be implemented in hardware, or hardware combined with one or both of software and/or firmware. For example, event stream processing system 100, streaming node 108, machine learning model manager 122, downstream marshaller 110, compute processors 112A-112N, upstream marshaller 114, machine learning model source 208, compute processor 212, machine learning model manager 222, model journal 204, memory 220, machine learning runtime component 206, request handler 228, validity generator 210, temporal joiner 214, scoring operator 216, machine learning models 238A-238B, cleanup threshold 506, streaming node 608, machine learning model manager 622, model discoverer 602, model journal 604, machine learning runtime component 606, memory 620, machine learning model 638, compute processor 612, validity generator 610, temporal joiners 614A-616N, scoring operators 616A-616N, machine learning model source 712, centralized node 710, machine learning model manager 722, model discoverer 702, model journal 704, machine learning runtime component 706, memory 720, machine learning model 738, and/or streaming nodes 708A-708N (and/or any of the components described therein), and/or flowchart 300 and/or 400 may be implemented as computer program code/instructions configured to be executed in one or more processors and stored in a computer readable storage medium.

Alternatively, event stream processing system 100, streaming node 108, machine learning model manager 122, downstream marshaller 110, compute processors 112A-112N, upstream marshaller 114, machine learning model source 208, compute processor 212, machine learning model manager 222, model journal 204, memory 220, machine learning runtime component 206, request handler 228, validity generator 210, temporal joiner 214, scoring operator 216, machine learning models 238A-238B, cleanup threshold 506, streaming node 608, machine learning model manager 622, model discoverer 602, model journal 604, machine learning runtime component 606, memory 620, machine learning model 638, compute processor 612, validity generator 610, temporal joiners 614A-616N, scoring operators 616A-616N, machine learning model source 712, centralized node 710, machine learning model manager 722, model discoverer 702, model journal 704, machine learning runtime component 706, memory 720, machine learning model 738, and/or streaming nodes 708A-708N (and/or any of the components described therein), and/or flowchart 300 and/or 400 may be implemented as hardware logic/electrical circuitry.

For instance, in an embodiment, one or more, in any combination, of event stream processing system 100, streaming node 108, machine learning model manager 122, downstream marshaller 110, compute processors 112A-112N, upstream marshaller 114, machine learning model source 208, compute processor 212, machine learning model manager 222, model journal 204, memory 220, machine learning runtime component 206, request handler 228, validity generator 210, temporal joiner 214, scoring operator 216, machine learning models 238A-238B, cleanup threshold 506, streaming node 608, machine learning model manager 622, model discoverer 602, model journal 604, machine learning runtime component 606, memory 620, machine learning model 638, compute processor 612, validity generator 610, temporal joiners 614A-616N, scoring operators 616A-616N, machine learning model source 712, centralized node 710, machine learning model manager 722, model discoverer 702, model journal 704, machine learning runtime component 706, memory 720, machine learning model 738, and/or streaming nodes 708A-708N (and/or any of the components described therein), and/or flowchart 300 and/or 400 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 8:
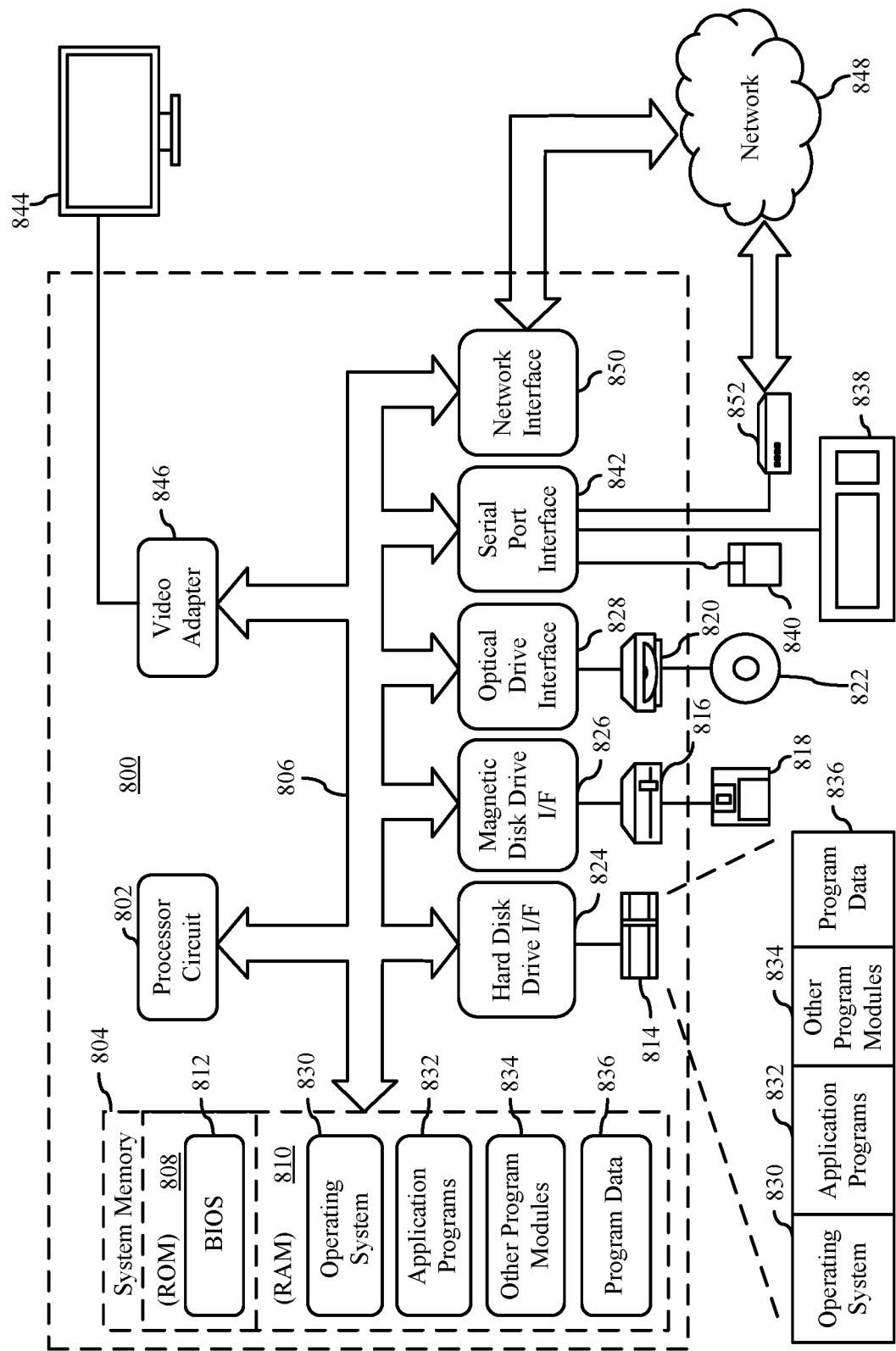
FIG. 8 is a block diagram of an example processor-based computer system that may be used to implement various embodiments.

FIG. 8 depicts an exemplary implementation of a computing device 800 in which embodiments may be implemented. For example, streaming nodes 108, machine learning model manager 122, downstream marshaller 110, compute processors 112A-112N, upstream marshaller 114, compute processor 212, machine learning model manager 222, streaming node 608, centralized node 710, and/or streaming nodes 708A-708N (and/or any of the components described therein) may be implemented in one or more computing devices similar to computing device 800 in stationary or mobile computer embodiments, including one or more features of computing device 800 and/or alternative features. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing any of the features of event stream processing system 100, streaming node 108, machine learning model manager 122, downstream marshaller 110, compute processors 112A-112N, upstream marshaller 114, machine learning model source 208, compute processor 212, machine learning model manager 222, model journal 204, memory 220, machine learning runtime component 206, request handler 228, validity generator 210, temporal joiner 214, scoring operator 216, machine learning models 238A-238B, cleanup threshold 506, streaming node 608, machine learning model manager 622, model discoverer 602, model journal 604, machine learning runtime component 606, memory 620, machine learning model 638, compute processor 612, validity generator 610, temporal joiners 614A-616N, scoring operators 616A-616N, machine learning model source 712, centralized node 710, machine learning model manager 722, model discoverer 702, model journal 704, machine learning runtime component 706, memory 720, machine learning model 738, and/or streaming nodes 708A-708N (and/or any of the components described therein), and/or flowchart 300 and/or 400, and/or further embodiments described herein.

A user may enter commands and information into computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

A method in a streaming node for determining a machine learning model for an event stream comprising a plurality of data events is described herein. The method comprises:

receiving a punctuation event for a plurality of first machine learning models; determining whether a machine learning model of the first machine learning models is temporally valid with respect to a particular data event of the event stream based on the punctuation event; and in response to determining that the machine learning model is temporally valid, providing the particular data event to the determined machine learning model, the determined machine learning model configured to perform a scoring operation with respect to the particular data event.

In one embodiment of the foregoing method, the method further comprises: in response to determining that none of the first machine learning models are temporally valid, holding the particular data event until a second punctuation event that indicates that a second machine learning model is temporally valid is received.

In one embodiment of the foregoing method, the punctuation event comprises a first timestamp that indicates a latest time period for which there is a temporally valid machine learning model of the machine learning models, and each data event of the event stream comprises a second timestamp.

In one embodiment of the foregoing method, said determining whether a machine learning model of the first machine learning models is temporally valid with respect to a particular data event of the event stream based on the punctuation event comprises: determining whether the second timestamp of the particular data event is less than or equal to the first timestamp of the punctuation event; in response to determining that the second timestamp of the particular data event is less than or equal to the first timestamp of the punctuation event, determining that the machine learning model is temporally valid with respect to the particular data event; and in response to determining that the second timestamp of the particular data event is greater than the first timestamp of the punctuation event, determining that none of the first machine learning models are temporally valid with respect to the particular data event.

In one embodiment of the foregoing method, said receiving the punctuation event comprises: receiving the punctuation event based on a machine learning model journal that maintains a time range for each of the first machine learning models, each time range specifying a range of time in which a corresponding machine learning model of the first machine learning models is valid.

In one embodiment of the foregoing method, the machine learning model journal is populated with the time range for each of the first machine learning models by a discovery entity configured to discover machine learning models that are available for performing scoring operations with respect to the event stream.

In one embodiment of the foregoing method, at least one of the machine learning model journal or the discovery entity are maintained by an entity external to the streaming node.

A streaming node is also described herein. The streaming node includes at least one processor circuit; and at least one memory that stores program code configured to be executed by the at least one processor circuit, the program code comprising: a temporal joiner configured to: receive a punctuation event for a plurality of first machine learning models; and determine whether a machine learning model of the first machine learning models is temporally valid with respect to a particular data event of an event stream based on the punctuation event; and a scoring operator configured to: in response to determining that the machine learning model is temporally valid, provide the particular data event to the determined machine learning model, the determined machine learning model configured to perform a scoring operation with respect to the particular data event.

In one embodiment of the foregoing system, the temporal joiner is further configured to: in response to determining that none of the first machine learning models are temporally valid, hold the particular data event until a second punctuation event that indicates that a second machine learning model is temporally valid is received.

In one embodiment of the foregoing system, the punctuation event comprises a first timestamp that indicates a latest time period for which there is a temporally valid machine learning model of the machine learning models, and each data event of the event stream comprises a second timestamp.

In one embodiment of the foregoing system, the temporal joiner is further configured to: determine whether the second timestamp of the particular data event is less than or equal to the first timestamp of the punctuation event; in response to determining that the second timestamp of the particular data event is less than or equal to the first timestamp of the punctuation event, determine that the machine learning model is temporally valid with respect to the particular data event; and in response to determining that the second timestamp of the particular data event is greater than the first timestamp of the punctuation event, determine that none of the first machine learning models are temporally valid with respect to the particular data event.

In one embodiment of the foregoing system, the temporal joiner is further configured to: receive the punctuation event based on a machine learning model journal that maintains a time range for each of the first machine learning models, each time range specifying a range of time in which a corresponding machine learning model of the first machine learning models is valid.

In one embodiment of the foregoing system, the machine learning model journal is populated with the time range for each of the first machine learning models by a discovery entity configured to discover machine learning models that are available for performing scoring operations with respect to the event stream.

In one embodiment of the foregoing system, at least one of the machine learning model journal or the discovery entity are maintained by an entity external to the streaming node.

In one embodiment of the foregoing system, the program code further comprises: a policy enforcer configured to enable the application to execute while enabling an audit mode of the integrity policy in which policy violations caused via execution of the application are detected but enforcement of the integrity policy is disabled; and an operation analyzer configured to: analyze operations of the application that caused the detected policy violations to determine whether such operations are legitimate; in response to a determination that the operations are legitimate: update the integrity policy to support the operations that caused the detected policy violations, thereby causing such operations to be no longer considered policy violations; and disable the audit mode; and in response to a determination that the operations are illegitimate, maintain the integrity policy.

A computer-readable storage medium having program instructions recorded thereon that, when executed by at least one processor of a computing device, perform a method. The method comprises: receiving a punctuation event for a plurality of first machine learning models; determining whether a machine learning model of the first machine learning models is temporally valid with respect to a particular data event of the event stream based on the punctuation event; and in response to determining that the machine learning model is temporally valid, providing the particular data event to the determined machine learning model, the determined machine learning model configured to perform a scoring operation with respect to the particular data event.

In one embodiment of the foregoing computer-readable storage medium, the method further comprises: in response to determining that none of the first machine learning models are temporally valid, holding the particular data event until a second punctuation event that indicates that a second machine learning model is temporally valid is received.

In one embodiment of the foregoing computer-readable storage medium, the punctation event comprises a first timestamp that indicates a latest time period for which there is a temporally valid machine learning model of the machine learning models, and each data event of the event stream comprises a second timestamp.

In one embodiment of the foregoing computer-readable storage medium, said determining whether a machine learning model of the first machine learning models is temporally valid with respect to a particular data event of the event stream based on the punctuation event comprises: determining whether the second timestamp of the particular data event is less than or equal to the first timestamp of the punctuation event; in response to determining that the second timestamp of the particular data event is less than or equal to the first timestamp of the punctuation event, determining that the machine learning model is temporally valid with respect to the particular data event; and in response to determining that the second timestamp of the particular data event is greater than the first timestamp of the punctuation event, determining that none of the first machine learning models are temporally valid with respect to the particular data event.

In one embodiment of the foregoing computer-readable storage medium, said receiving the punctuation event comprises: receiving the punctuation event based on a machine learning model journal that maintains a time range for each of the first machine learning models, each time range specifying a range of time in which a corresponding machine learning model of the first machine learning models is valid.

In one embodiment of the foregoing computer-readable storage medium, the machine learning model journal is populated with the time range for each of the first machine learning models by a discovery entity configured to discover machine learning models that are available for performing scoring operations with respect to the event stream.

VI. Example Embodiments

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method in a streaming node for determining a machine learning model for an event stream comprising a plurality of data events, comprising:
   receiving a punctuation event for a plurality of first machine learning models, the punctuation event comprising a first timestamp that indicates the latest time period for which there is a temporally valid machine learning model of the first machine learning models;
   comparing a second timestamp associated with a particular data event of the event stream and the first timestamp of the punctuation event;
   in response to determining that the second timestamp is greater than the first timestamp, determining that none of the first machine learning models are temporally valid with respect to the particular data event;
   in response to determining that the second timestamp of the particular data event is less than or equal to the first timestamp, determining that a machine learning model of the first machine learning models is temporally valid with respect to the particular data event of the event stream; and
   in response to determining that the machine learning model is temporally valid, providing the particular data event to the determined machine learning model, the determined machine learning model configured to perform a scoring operation with respect to the particular data event.

2. The method of claim 1, further comprising:
   in response to determining that none of the first machine learning models are temporally valid, holding the particular data event until a second punctuation event that indicates that a second machine learning model is temporally valid is received.

3. The method of claim 1, wherein said receiving the punctuation event comprises:
   receiving the punctuation event based on a machine learning model journal that maintains a time range for each of the first machine learning models, each time range specifying a range of time in which a corresponding machine learning model of the first machine learning models is valid.

4. The method of claim 3, wherein the machine learning model journal is populated with the time range for each of the first machine learning models by a discovery entity configured to discover machine learning models that are available for performing scoring operations with respect to the event stream.

5. The method of claim 4, wherein at least one of the machine learning model journal or the discovery entity are maintained by an entity external to the streaming node.

6. The method of claim 3, wherein the range of time in which the corresponding machine learning model is valid is specified via an update notification.

7. The method of claim 3, wherein the punctuation event is generated responsive to a new record being added to the machine learning model journal.

8. A streaming node, comprising:
   at least one processor circuit; and
   at least one memory that stores program code configured to be executed by the at least one processor circuit, the program code comprising:
   a temporal joiner configured to:
      receive a punctuation event for a plurality of first machine learning models, the punctuation event comprising a first timestamp that indicates the latest time period for which there is a temporally valid machine learning model of the first machine learning models, compare a second timestamp associated with a particular data event of the event stream and the first timestamp of the punctuation event, in response to determining that the second timestamp is greater than the first timestamp, determining that none of the first machine learning models are temporally valid with respect to the particular data event, and in response to determining that the second timestamp of the particular data event is less than or equal to the first timestamp determine that a machine learning model of the first machine learning models is temporally valid with respect to the particular data event of an event stream; and a scoring operator configured to:

in response to determining that the machine learning model is temporally valid, provide the particular data event to the determined machine learning model, the determined machine learning model configured to perform a scoring operation with respect to the particular data event.

9. The streaming node of claim 8, wherein the temporal joiner is further configured to:

in response to determining that none of the first machine learning models are temporally valid, hold the particular data event until a second punctuation event that indicates that a second machine learning model is temporally valid is received.

10. The streaming node of claim 8, wherein the temporal joiner is further configured to:

receive the punctuation event based on a machine learning model journal that maintains a time range for each of the first machine learning models, each time range specifying a range of time in which a corresponding machine learning model of the first machine learning models is valid.

11. The streaming node of claim 10, wherein the machine learning model journal is populated with the time range for each of the first machine learning models by a discovery entity configured to discover machine learning models that are available for performing scoring operations with respect to the event stream.

12. The streaming node of claim 11, wherein at least one of the machine learning model journal or the discovery entity are maintained by an entity external to the streaming node.

13. The streaming node of claim 10, wherein the range of time in which the corresponding machine learning model is valid is specified via an update notification.

14. The streaming node of claim 10, wherein the punctuation event is generated responsive to a new record being added to the machine learning model journal.

15. A computer-readable storage medium having program instructions recorded thereon that, when executed by at least one processor of a computing device, perform a method, the method comprising:

receiving a punctuation event for a plurality of first machine learning models, the punctuation event comprising a first timestamp that indicates the latest time period for which there is a temporally valid machine learning model of the first machine learning models;

comparing a second timestamp associated with a particular data event of the event stream and the first timestamp of the punctuation event;

in response to determining that the second timestamp is greater than the first timestamp, determining that none of the first machine learning models are temporally valid with respect to the particular data event;

in response to determining that the second timestamp of the particular data event is less than or equal to the first timestamp, determining that a machine learning model of the first machine learning models is temporally valid with respect to the particular data event of the event stream; and in response to determining that the machine learning model is temporally valid, providing the particular data event to the determined machine learning model, the determined machine learning model configured to perform a scoring operation with respect to the particular data event.

16. The computer-readable storage medium of claim 15, the method further comprising:

in response to determining that none of the first machine learning models are temporally valid, holding the particular data event until a second punctuation event that indicates that a second machine learning model is temporally valid is received.

17. The computer-readable storage medium of claim 15, wherein said receiving the punctuation event comprises:

receiving the punctuation event based on a machine learning model journal that maintains a time range for each of the first machine learning models, each time range specifying a range of time in which a corresponding machine learning model of the first machine learning models is valid.

18. The computer-readable storage medium of claim 17, wherein the machine learning model journal is populated with the time range for each of the first machine learning models by a discovery entity configured to discover machine learning models that are available for performing scoring operations with respect to the event stream.

19. The computer-readable storage medium of claim 17, wherein the range of time in which the corresponding machine learning model is valid is specified via an update notification.

20. The computer-readable storage medium of claim 17, wherein the punctuation event is generated responsive to a new record being added to the machine learning model journal.

* * * * *